(12) United States Patent
Takadera et al.

(10) Patent No.: US 6,522,503 B2
(45) Date of Patent: Feb. 18, 2003

(54) SUSPENSION FOR DISC DRIVE

(75) Inventors: Ichiro Takadera, Tokyo (JP);
Kazuhiko Otake, Atsugi (JP); Akihiro Takei, Komagane (JP)

(73) Assignee: NHK Spring Co., Ltd., Yokohama (JP)

( * ) Notice: Subject to any disclaimer, the term of this patent is extended or adjusted under 35 U.S.C. 154(b) by 120 days.

(21) Appl. No.: 09/817,092

(22) Filed: Mar. 26, 2001

(65) Prior Publication Data

US 2001/0030838 A1 Oct. 18, 2001

(30) Foreign Application Priority Data

Apr. 13, 2000 (JP) ........................................ 2000-112282

(51) Int. Cl.[7] .............................................. G11B 21/16
(52) U.S. Cl. ................................................... 360/245.2
(58) Field of Search ............................... 360/245–245.9

(56) References Cited

U.S. PATENT DOCUMENTS 5,812,344 A * 9/1998 Balakrishnan
6,215,627 B1 * 4/2001 Resh et al. ............... 360/245.6
6,313,971 B1 * 11/2001 Takagi et al. ............. 360/245.2
6,381,100 B1 * 4/2002 Bennin et al. ............ 360/245.9

* cited by examiner

Primary Examiner—Allen Cao
(74) Attorney, Agent, or Firm—Frishauf, Holtz, Goodman & Chick, P.C.

(57) ABSTRACT

There is disclosed a disc drive suspension in which a first reference hole and spring portion, and a second reference hole and spring portion are formed in a load beam of the suspension. A third reference hole and spring portion, and a fourth reference hole and spring portion are formed in a flexure. When a first positioning pin of a positioning jig is inserted into the first and third reference holes, the first and third spring portions abut on the first positioning pin, and the load beam and flexure are thereby urged in an axial direction. When a second positioning pin is inserted into the second and fourth reference holes, the second and fourth spring portions abut on the second positioning pin, and the load beam and flexure are thereby urged in the axial direction, and are both positioned.

12 Claims, 10 Drawing Sheets

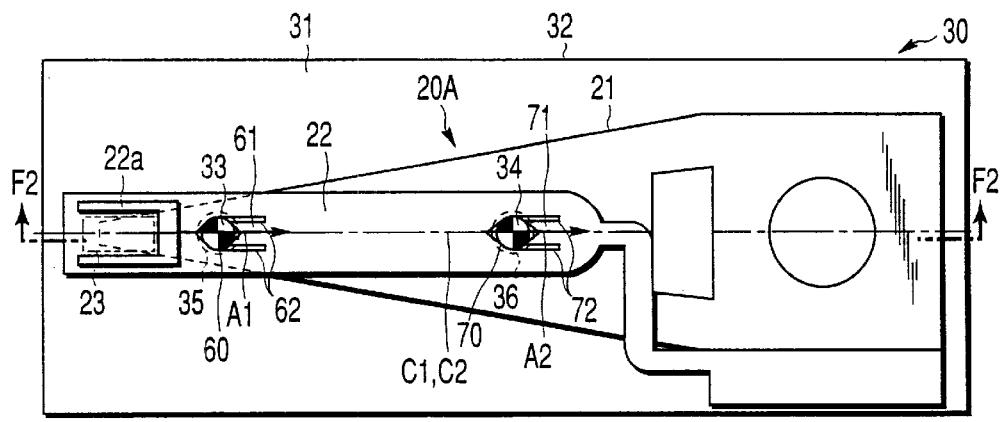
F I G. 1
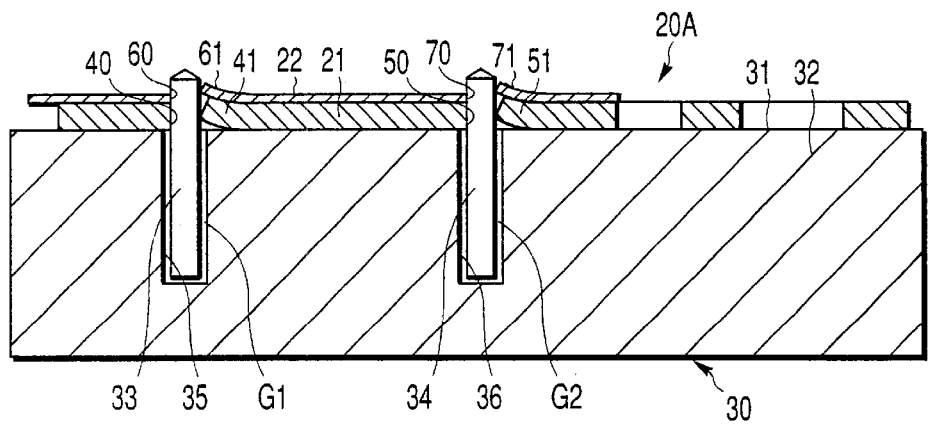
F I G. 2
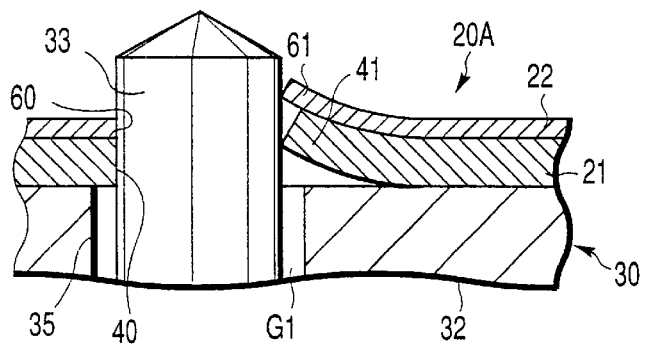
F I G. 3

40,50,60,70  41,51,61,71

40,50,60,70  41,51,61,71

40,50,60,70  41,51,61,71

40,50,60,70  41,51,61,71

40,50,60,70  41,51,61,71

40,50,60,70  41,51,61,71

40,50,60,70  90  41,51,61,71

40,50,60,70  90  41,51,61,71

40,50,60,70  90  41,51,61,71

40,50,60,70  90  41,51,61,71

40,50,60,70  90  41,51,61,71

40,50,60,70  90  41,51,61,71

SUSPENSION FOR DISC DRIVE

CROSS-REFERENCE TO RELATED APPLICATIONS

This application is based upon and claims the benefit of priority from the prior Japanese Patent Application No. 2000-112282, filed Apr. 13, 2000, the entire contents of which are incorporated herein by reference.

BACKGROUND OF THE INVENTION

The present invention relates to a suspension for a disc drive disposed in an information processing apparatus such as a personal computer.

In a disc drive provided with a rotary magnetic disc or a magneto optical disc, a magnetic head is used to record or read data with respect to a disc recording surface. This magnetic head includes a slider disposed opposite to the disc recording surface, and a transducer disposed in a slider. When the disc rotates at a high speed, the slider slightly lifts above the disc, and an air bearing is therefore formed between the disc and the slider.

In an example shown by FIG. 22, a suspension for disc drive for holding the magnetic head includes a load beam 1 of a precise plate spring, a flexure 2 of a thin plate spring fixed to a tip end of the load beam 1, and a base plate 3 fixed to a base of the load beam 1. A slider 4 is attached to a tip end of the flexure 2.

In an assembling process of such suspension, it is remarkably important to accurately position the load beam 1 and flexure 2. Positions of the load beam 1 and flexure 2 which have to be originally in an accurate positional relation deviate, and a position of the slider 4 attached later deviates.

For example, as shown in FIG. 22, it is assumed that a position deviation ΔC is produced between a center line C1 of the load beam 1 and a center line C2 of the flexure 2. In this case, as shown in FIG. 23, distances D1, D2 between a center C3 of the slider 4 and opposite sides of the flexure 2 differ from each other. As a result, a dynamic balance of spring pressures P1, P2 on opposite sides of the flexure 2 is destroyed, and the slider 4 cannot be stabilized and cannot be lifted above the disc. In this case, data is unstably written or read with respect to the disc.

To mutually position the load beam 1 and flexure 2, a positioning jig 10 as shown in FIG. 24 and 25 has been proposed. Two reference holes 11, 12 are formed in the load beam 1. Two reference holes 13, 14 are also formed in the flexure 2. One common positioning pin 15 is inserted into the reference holes 11, 13 positioned on the left side in FIG. 25. Two positioning pins 16, 17 independent of each other are inserted into the reference holes 12, 14 positioned on the right side. When the pins 16, 17 are pulled in directions shown by arrows F1, F2 in FIG. 24 by urging means 18 such as a spring or actuator, the load beam 1 and flexure 2 are positioned. These positioning pins 15, 16, 17 are disposed on a common jig main body 19.

Since the urging means 18 is disposed in the conventional positioning jig 10,, a structure is remarkably complicated. Additionally, in the positioning jig 10, the positions of the pins 15, 16, 17 are required to be managed with high precision. Therefore, when a plurality of jigs 10 are manufactured, it is difficult to manufacture the same jig. When the number of jigs 10 increases, a dispersion of the jig 10 tends to increase. As a result, positioning precision of the load beam 1 and flexure 2 is deteriorated. Moreover, since the constitution of the jig 10 is complicated, it needs to be constantly monitored/checked whether or not the urging means 18 accurately operates, and this requires remarkably much troublesome and time.

Additionally, the conventional positioning jig 10 requires three pins 15, 16, 17. One of these pins is the pin 15 common to the load beam 1 and flexure 2. For the remaining two pins 16, 17, one is the pin 16 for pulling the load beam 1, and the other is the pin 17 for pulling the flexure 2. Since two pins 16, 17 independent of each other are used, the positions of the pins 16, 17 sometimes deviate from each other in an Y-axis direction in FIG. 24. This also deteriorates the position precision of the load beam 1 with the flexure 2.

BRIEF SUMMARY OF THE INVENTION

Therefore, an object of the present invention is to provide a suspension for a disc drive in which a load beam and flexure can accurately be positioned, and a constitution of a positioning jig can be simplified.

According to a first aspect of the present invention, there is provided a suspension for a disc drive having a load beam, and a flexure fixed at a predetermined position of the load beam and provided with a magnetic head section, the suspension for the disc drive comprising:

a first reference hole which is formed in the vicinity of one end of the load beam and into which a first positioning pin is inserted; a first spring portion which is formed in a part of the load beam including an inner peripheral edge of the first reference hole and which abuts on the first positioning pin with elastic deformation to urge the load beam in an axial direction thereof; a second reference hole which is formed in the vicinity of the other end of the load beam and into which a second positioning pin is inserted; a second spring portion which is formed in a part of the load beam including an inner peripheral edge of the second reference hole and which abuts on the second positioning pin with the elastic deformation to urge the load beam in the axial direction thereof; a third reference hole which is formed in the vicinity of one end of the flexure and into which the first positioning pin is inserted; a third spring portion which is formed in a part of the flexure including an inner peripheral edge of the third reference hole and which abuts on the first positioning pin with elastic deformation to urge the flexure in an axial direction thereof; a fourth reference hole which is formed in the vicinity of the other end of the flexure and into which the second positioning pin is inserted; and a fourth spring portion which is formed in a part of the flexure including an inner peripheral edge of the fourth reference hole and which abuts on the second positioning pin with the elastic deformation to urge the flexure in the axial direction thereof.

In the suspension of the present invention, the first positioning pin is inserted into the first and third reference holes, and the second positioning pin is inserted into the second and fourth reference holes. When the first and third spring portions abut on the first positioning pin, the load beam and flexure are pulled in the axial direction, using the first positioning pin as a support. Moreover, since the second and fourth spring portions abut on the second positioning pin, the load beam and flexure are pulled in the axial direction, using the second positioning pin as the support. The load beam and flexure are positioned by two positioning pins in this manner.

According to the present invention, the respective spring portions formed on the load beam and flexure are utilized to pull the load beam and flexure in the axial direction thereof. Therefore, the positioning jig for positioning the load beam and flexure may be provided with two positioning pins. Additionally, since it is unnecessary to dispose the urging means on the positioning jig, a constitution of the positioning jig is simplified. Moreover, the positioning jig can accurately position the load beam and flexure without being influenced by positioning pin precision. The respective spring portions of the load beam and flexure are used only once in principle during positioning of one suspension. Therefore, spring fatigue or change with elapse of time does not have to be considered, monitoring check necessary for the urging means of a conventional positioning jig is unnecessary, and high precision is always obtained.

In the present invention, the first and second spring portions are, for example, elastically deformable portions between a pair of slits formed along the axial direction in the load beam, and the third and fourth spring portions are elastically deformable portions between a pair of slits formed along the axial direction in the flexure. According to the present invention, the spring portion can be formed in accordance with a length of the slit. In this case, when the spring portion is lengthened, a spring constant is lowered and the spring portion is easily deflected. The spring constant can be adjusted if necessary.

In the present invention, a guide surface for aligning center lines of the load beam and flexure with respect to the positioning pin may be formed on at least one of a tip end of the spring portion which abuts on the first positioning pin, and the inner peripheral edge of the reference hole. According to the present invention, when the spring portion is pressed onto the first positioning pin, the load beam and flexure can mutually be centered by the guide surface.

In the present invention, a guide surface for aligning center lines of the load beam and flexure with respect to the positioning pin may be formed on at least one of a tip end of the spring portion which abuts on the second positioning pin, and the inner peripheral edge of the reference hole. According to the present invention, when the spring portion is pressed onto the second positioning pin, the load beam and flexure can mutually be centered by the guide surface.

In the present invention, the respective tip ends of the third and fourth spring portions formed on the flexure may project to the inside of the reference hole from the respective tip ends of the first and second spring portions formed on the load beam. According to the present invention, even when the positioning pin is inserted into the respective reference holes and the first and second spring portions are deflected, the tip ends of the third and fourth spring portions are allowed to abut on the positioning pin.

In the present invention, in order to lower spring constants of the respective spring portions, a through hole or a portion with a reduced thickness may be formed in at least a part of the spring portion. According to the present invention, the spring portion can easily be deflected as occasion demands by lowering the spring constant of the spring portion.

According to another aspect of the present invention, there is provided a suspension for a disc drive, comprising: a first reference hole which is formed in the vicinity of one end of the load beam and into which a first positioning pin is inserted; a second reference hole which is formed in the vicinity of the other end of the load beam and into which a second positioning pin kept at a constant distance from the first positioning pin is inserted; a load beam spring portion which is formed in a part of the load beam including an inner peripheral edge of the first or second reference hole and which abuts on the first or second positioning pin with elastic deformation to urge the load beam in an axial direction thereof; a third reference hole which is formed in the vicinity of one end of the flexure and into which the first positioning pin is inserted; a fourth reference hole which is formed in the vicinity of the other end of the flexure and into which the second positioning pin is inserted; and a flexure spring portion which is formed in a part of the flexure including an inner peripheral edge of the third or fourth reference hole and which abuts on the first or second positioning pin with the elastic deformation to urge the flexure in an axial direction thereof.

In the suspension of the present invention, during positioning of the load beam and flexure, a positioning jig for keeping a distance (shortest distance) between the first positioning pin and the second positioning pin to be constant is used. The first positioning pin is inserted into the first and third reference holes, and the second positioning pin is inserted into the second and fourth reference holes. The load beam and flexure are pulled in the axial direction, using the one positioning pin as a support by the spring portions formed on the load beam and flexure, and positioned by the first and second positioning pins. According to the present invention, since the spring portion may be formed on one portion of the load beam and the flexure, shapes of the load beam and flexure are further simplified.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a plan view of a suspension and positioning jig showing a first embodiment of the present invention;

FIG. 2 is a sectional view of the suspension and positioning jig taken along line F2—F2 of FIG. 1;

FIG. 3 is a partially enlarged sectional view of the suspension and positioning jig shown in FIG. 1;

DETAILED DESCRIPTION OF THE INVENTION

A suspension 20A for a disc drive according to a first embodiment of the present invention will be described hereinafter with reference to FIG. 1 to FIG. 7.

Figure 5:
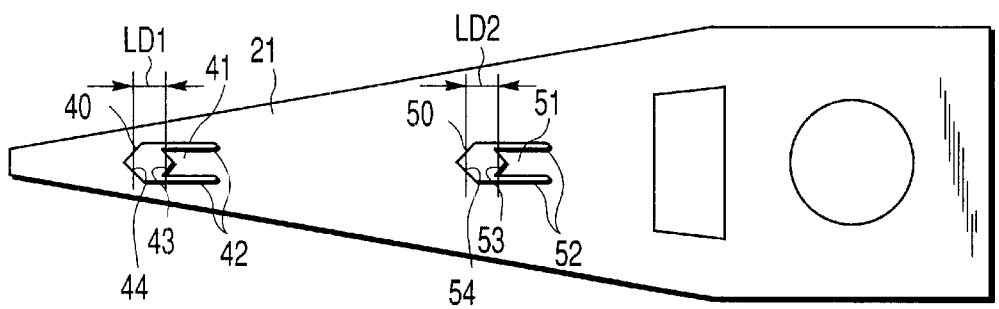
FIG. 5 is a plan view of a load beam of the suspension shown in FIG. 1.
Figure 6:
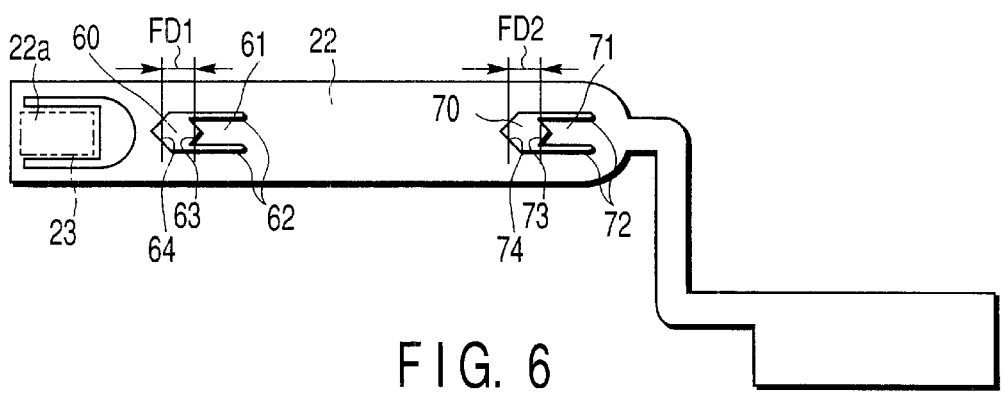
FIG. 6 is a plan view of a flexure of the suspension shown in FIG. 1.

The suspension 20A includes a load beam 21 and flexure 22. The load beam 21 is constituted of a precise thin leaf spring of a metal and formed, for example, as shown in FIG. 5. The flexure 22 is formed of a precise metal leaf spring thinner than that of the load beam 21 and formed, for example, as shown in FIG. 6.

The flexure 22 is superposed onto a predetermined position of the load beam 21, and fixed to the load beam 21 by appropriate fixing means such as laser welding. After the flexure 22 is fixed to the load beam 21, a magnetic head slider 23 is attached to a head attachment portion 22a of a front end of the flexure 22.

In a manufacturing process of the suspension 20A, the load beam 21 and flexure 22 are positioned by a positioning jig 30 shown in FIG. 1 and FIG. 2. The positioning jig 30 includes a jig main body 32 having a flat upper surface 31, a first positioning pin 33, and a second positioning pin 34. These positioning pins 33, 34 are inserted into holes 35, 36 formed in the jig main body 32. Each of the positioning pins 33, 34 has a cylindrical shape with a pointed upper end. An outer diameter of the positioning pin 33, 34 is slightly smaller than an inner diameter of the hole 35, 36. A gap G1, G2 is secured between an outer peripheral surface of the pin 33, 34 and an inner surface of the hole 35, 36 such that the pin 33, 34 can move to some degree in a diametrical direction.

A first reference hole 40 is formed in the vicinity of a front end of the load beam 21. The first positioning pin 33 is inserted into the first reference hole 40. A first spring portion 41 is formed in a part of the load beam 21 including an inner peripheral edge of the first reference hole 40. For the spring portion 41, since a pair of slits 42 are formed in a part of the load beam 21 along an axial direction, a region between the slits 42 can elastically be deformed in a plate thickness direction.

Figure 4:
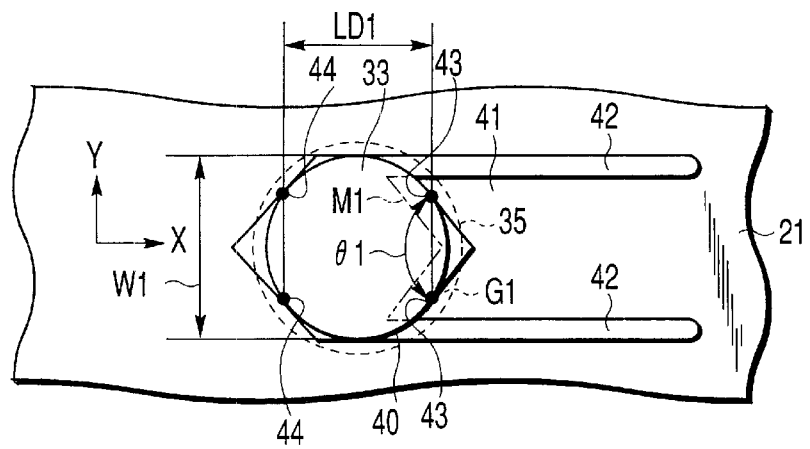
FIG. 4 is a plan view showing a part of the suspension shown in FIG. 1, and a positioning pin.

As shown by a two-dot chain line M1 in FIG. 4, a tip end of the first spring portion 41 is several micrometers to several tens of micrometers long from a position in which the spring portion 41 is deflected by insertion of the pin 33 before the first positioning pin 33 is inserted into the reference hole 40. Therefore, when the first positioning pin 33 is inserted into the reference hole 40, the spring portion 41 is elastically deformed to abut on the pin 33, and the load beam 21 is urged in the axial direction shown by an arrow A1 in FIG. 1.

Guide surfaces 43, 44 are formed in V shapes as seen from above in the tip end of the first spring portion 41 and the inner peripheral edge of the reference hole 40 disposed opposite to the tip end of the spring portion 41. These guide surfaces 43, 44 fulfill centering functions to align a center line C1 of the load beam 21 with the pin 33 when the first positioning pin 33 abuts on the guide surfaces 43, 44. In FIG. 4, a position deviation of the load beam 21 with respect to the pin 33 in a Y-axis direction can be regulated by an angle θ1 formed by the V-shaped guide surface 43 and width W1 of the reference hole 40.

A second reference hole 50 is formed in the vicinity of the other end (rear end) of the load beam 21. The second positioning pin 34 is inserted into the reference hole 50. A second spring portion 51 is formed in a part of the load beam 21 including the inner peripheral edge of the second reference hole 50. For the spring portion 51, since a pair of slits 52 are formed in a part of the load beam 21 along the axial direction, a region between the slits 52 can elastically be deformed in the plate thickness direction.

Similarly as the first spring portion 41 shown in FIG. 4, a tip end of the second spring portion 51 is several micrometers to several tens of micrometers long from a position in which the spring portion 51 is deflected by insertion of the pin 34 before the second positioning pin 34 is inserted into the reference hole 50. Therefore, when the second positioning pin 34 is inserted into the second reference hole 50, the second spring portion 51 is elastically deformed to abut on the pin 34, and the load beam 21 is urged in the axial direction shown by an arrow A2 in FIG. 1.

Guide surfaces 53, 54 are formed in V shapes as seen from above in the tip end of the second spring portion 51 and the inner peripheral edge of the reference hole 50 disposed opposite to the tip end of the spring portion 51. These guide surfaces 53, 54 fulfill centering functions to align the center line C1 of the load beam 21 with the pin 34 when the second positioning pin 34 abuts on the guide surfaces 53, 54.

A third reference hole 60 is formed in the vicinity of the front end of the flexure 22. The first positioning pin 33 is inserted into the reference hole 60. A third spring portion 61 is formed in a part of the flexure 22 including the inner peripheral edge of the third reference hole 60. For the spring portion 61, since a pair of slits 62 are formed in a part of the flexure 22 along the axial direction, a region between the slits 62 can elastically be deformed in the plate thickness direction.

Similarly as the first spring portion 41 shown in FIG. 4, a tip end of the third spring portion 61 is several micrometers to several tens of micrometers long from a position in which the spring portion 61 is deflected by insertion of the pin 33 before the first positioning pin 33 is inserted into the reference hole 60. Therefore, when the first positioning pin 33 is inserted into the third reference hole 60, the third spring portion 61 is elastically deformed to abut on the pin 33, and the flexure 22 is urged in the axial direction shown by the arrow A1 in FIG. 1.

Guide surfaces 63, 64 are formed in V shapes as seen from above in the tip end of the third spring portion 61 and the inner peripheral edge of the reference hole 60 disposed opposite to the tip end of the spring portion 61. These guide surfaces 63, 64 fulfill centering functions to align a center line C2 of the flexure 22 with the pin 33 when the first positioning pin 33 abuts on the guide surfaces 63, 64.

Figure 7:
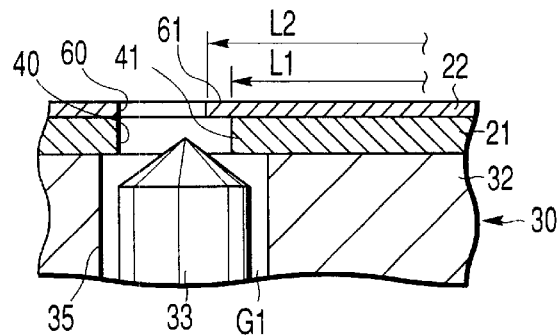
FIG. 7 is a sectional view showing a state before the positioning pin is inserted into a reference hole of the suspension shown in FIG. 1.

As shown in FIG. 7, a length L2 of the third spring portion 61 is set to be more than a length L1 of the first spring portion 41. That is, the tip end of the third spring portion 61 projects to the inside of the reference hole 40, 60 from the tip end of the first spring portion 41 before the pin 33 is inserted into the reference hole 40, 60. Therefore, as shown in FIG. 3, when the pin 33 is inserted into the reference hole 40, 60 and the first spring portion 41 is deflected upward, the tip end of the third spring portion 61 can about on the pin 33. Additionally, when the length L1 is equal to the length L2, and the first spring portion 41 is deflected upward, the tip end of the third spring portion 61 cannot reach the pin 33.

As the length L1, L2 of the spring portion 41, 61 increases, a spring constant of the spring portion 41, 61 decreases, and the spring portion 41, 61 is easily deflected. When the length L1, L2 decreases, the spring constant of the spring portion 41, 61 increases, and the spring portion is not easily deflected. That is, resilience force of the spring portion 41, 61 can be adjusted in accordance with the length L1, L2 of the spring portion 41, 61.

A fourth reference hole 70 is formed in the vicinity of the rear end of the flexure 22. The second positioning pin 34 is inserted into the reference hole 70. A fourth spring portion 71 is formed in a part of the flexure 22 including the inner peripheral edge of the fourth reference hole 70. For the fourth spring portion 71, since a pair of slits 72 are formed in a part of the flexure 22 along the axial direction, a region between the slits 72 can elastically be deformed in the plate thickness direction.

Similarly as the first spring portion 41 shown in FIG. 4, a tip end of the fourth spring portion 71 is several micrometers to several tens of micrometers long from a position in which the spring portion 71 is deflected by insertion of the pin 34 before the second positioning pin 34 is inserted into the reference hole 70. Therefore, when the pin 34 is inserted into the reference hole 70, the fourth spring portion 71 is elastically deformed to abut on the pin 34, and the flexure 22 is urged in the axial direction shown by the arrow A2 in FIG. 1.

Guide surfaces 73, 74 are formed in V shapes as seen from above in the tip end of the fourth spring portion 71 and the inner peripheral edge of the reference hole 70 disposed opposite to the tip end of the spring portion 71. These guide surfaces 73, 74 fulfill centering functions to align the center line C2 of the flexure 22 with the pin 34 when the second positioning pin 34 abuts on the guide surfaces 73, 74.

Similarly as the lengths L1, L2 of the spring portions 41, 61 shown in FIG. 7, the length of the fourth spring portion 71 is set to be more than that of the second spring portion 51, and the tip end of the fourth spring portion 71 thereby projects to the inside of the reference holes 50, 70 from the tip end of the second spring portion 51. In this case, when the pin 34 is inserted into the reference holes 50, 70 and the second spring portion 51 is deflected upward, the tip end of the fourth spring portion 71 can abut on the pin 34.

In this embodiment, while one pin 33 is inserted into the reference holes 40, 60, and the other pin 34 is inserted in the reference holes 50, 70, the spring portions 41, 51 of the load beam 21, and the spring portions 61, 71 of the flexure 22 need to abut on the pins 33, 34 for aligning, respectively.

Before an aligned state, a distance FD1 shown in FIG. 6 between a pin abutment portion of the guide surface 64 of the reference hole 60 and the pin abutment portion of the spring portion 61 is set to be shorter than a distance LD1 shown in FIG. 5 between the pin abutment portion of the guide surface 44 of the first reference hole 40 and the pin abutment portion of the spring portion 41 (FD1<LD1). For the similar reason, a distance FD2 between the pin abutment portion of the guide surface 74 of the reference hole 70 and the pin abutment portion of the spring portion 71 is set to be shorter than a distance LD2 between the pin abutment portion of the guide surface 54 of the second reference hole 50 and the pin abutment portion of the spring portion 51 (FD2<LD2).

In the suspension 20A constituted as described above, the load beam 21 and flexure 22 are positioned by the positioning jig 30. During positioning, the first positioning pin 33 is inserted into the first and third reference holes 40 and 60, and the second positioning pin 34 is inserted into the second and fourth reference holes 50 and 70.

The first positioning pin 33 abuts on the tip ends of the first and third spring portions 41 and 61. Thereby, the load beam 21 and flexure 22 are pulled in the axial direction, using the first positioning pin 33 as the support, and are both centered. Moreover, the second positioning pin 34 abuts on the tip ends of the second and fourth spring portions 51 and 71. Thereby, the load beam 21 and flexure 22 are pulled in the axial direction, using the second positioning pin 34 as the support, and are both centered. The load beam 21 and flexure 22 can be positioned (aligned) by two positioning pins 33, 34 in this manner. This positioning is not influenced by position precision of the pins 33, 34 (precision of the jig 30). Additionally, during the alignment, the load beam 21 does not have to contact with the flexure 22 in the thickness direction, and a gap may exist between the load beam and the flexure.

A suspension 20B for the disc drive according to a second embodiment of the present invention will be described hereinafter with reference to FIG. 8 to FIG. 13. In the suspension 20B of the second embodiment, components common to those of the suspension 20A of the first embodiment are denoted with the same reference numerals as those of the first embodiment, and a part of description thereof is omitted.

Figure 12:
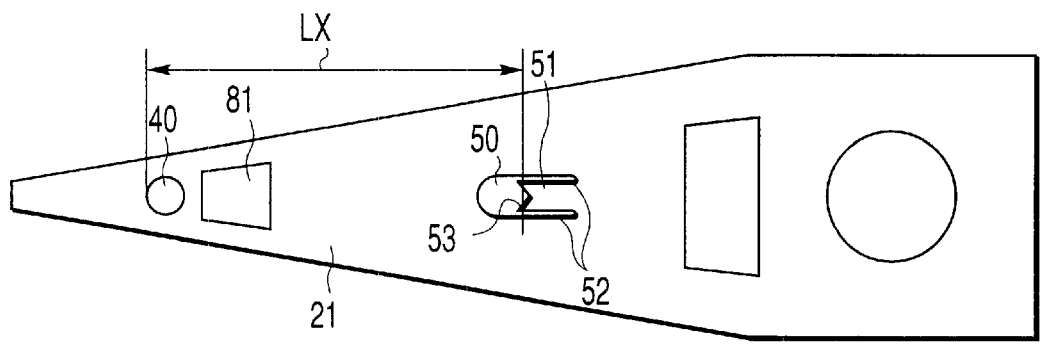
FIG. 12 is a plan view of the load beam of the suspension shown in FIG. 8.
Figure 13:
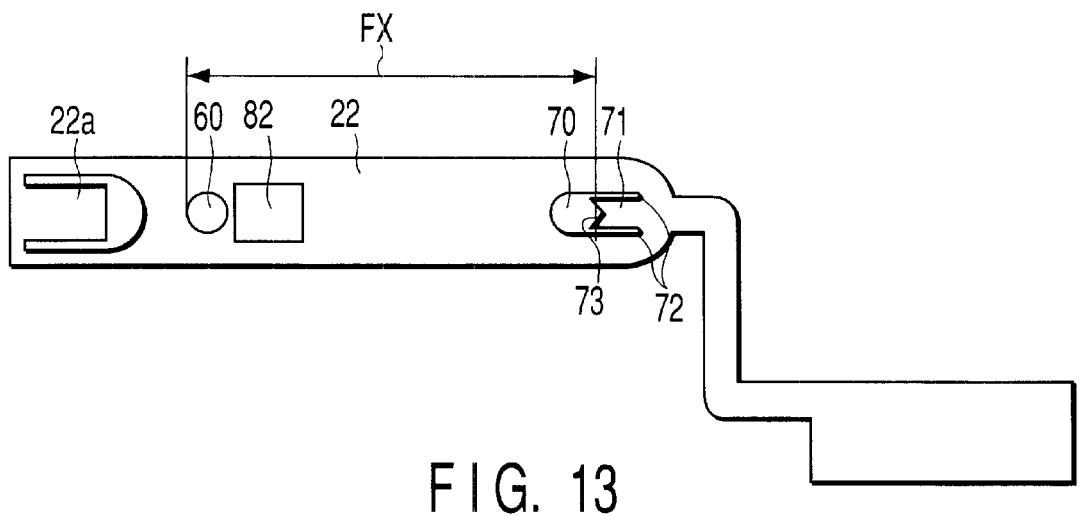
FIG. 13 is a plan view of the flexure of the suspension shown in FIG. 8.

The suspension 20B includes the load beam 21 and flexure 22. The load beam 21 is formed, for example, as shown in FIG. 12, and the flexure 22 is formed, for example, as shown in FIG. 13.

Figure 8:
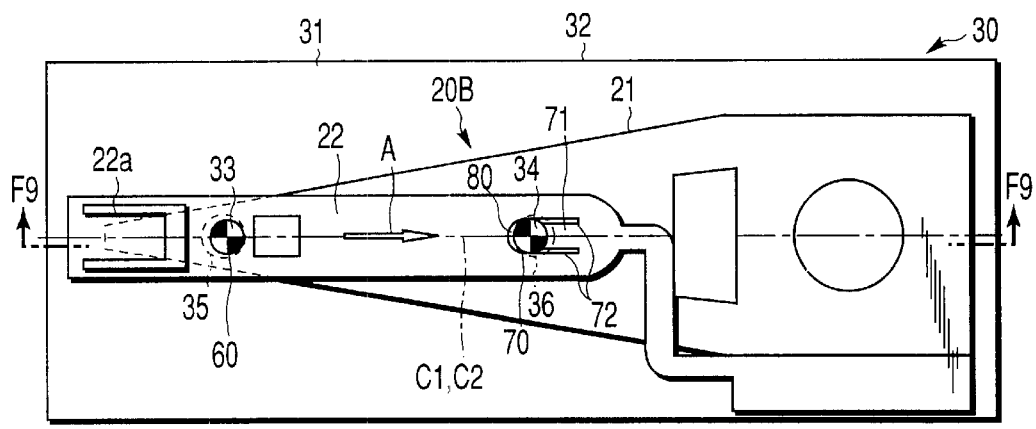
FIG. 8 is a plan view showing the suspension and positioning jig according to a second embodiment of the present invention.
Figure 9:
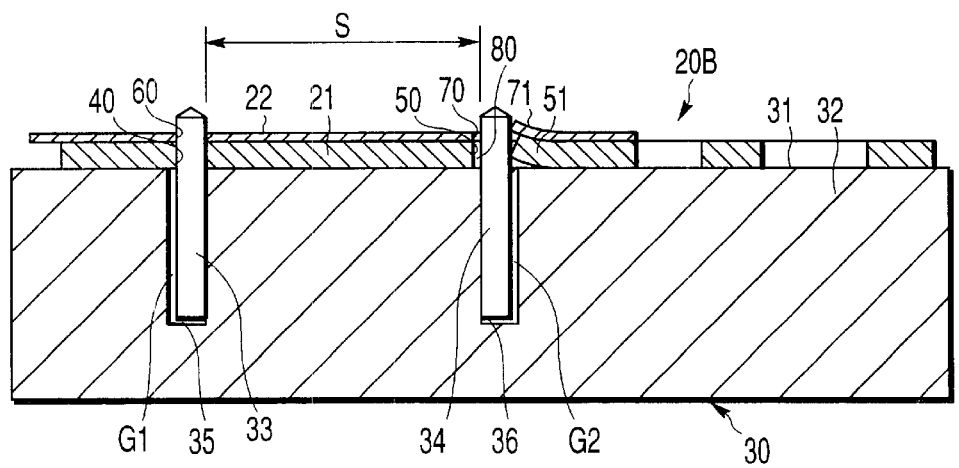
FIG. 9 is a sectional view of the suspension and positioning jig taken along a line F9—F9 in FIG. 8.

In the manufacturing process of the suspension 20B, the load beam 21 and flexure 22 are positioned by a positioning jig 30 shown in FIG. 8 and FIG. 9. The gaps G1, G2 exist between the outer peripheral surfaces of the positioning pins 33, 34 and the inner surfaces of the holes 35, 36 such that the pins 33, 34 can move to some degree in the diametrical direction. A shortest distance S between the pins 33 and 34 is accurately managed to indicate a predetermined value.

The circular first reference hole 40 is formed in the vicinity of the front end of the load beam 21. The first positioning pin 33 is inserted into the first reference hole 40. The second reference hole 50 is formed in the vicinity of the other end (rear end) of the load beam 21. The second reference hole 50 is a long hole along the axial direction of the load beam 21, and the second positioning pin 34 is inserted into the reference hole 50.

The spring portion 51 is formed in a part of the load beam 21 including the inner peripheral edge of the second reference hole 50. For the spring portion 51, since the pair of slits 52 are formed in a part of the load beam 21 along the axial direction, the region between the slits 52 can elastically be deformed in the plate thickness direction.

Figure 11:
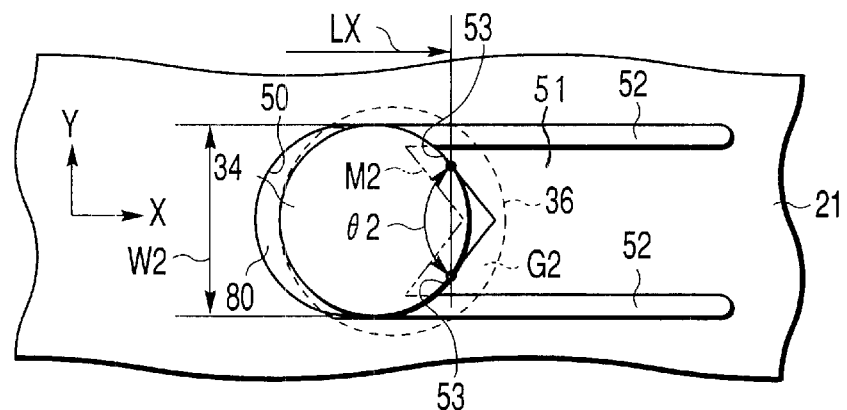
FIG. 11 is a plan view showing a part of the suspension shown in FIG. 8, and the positioning pin.

As shown by a two-dot chain line M2 in FIG. 11, the tip end of the spring portion 51 is several micrometers to several tens of micrometers long from the position in which the spring portion 51 is deflected by insertion of the pin 34 before the second positioning pin 34 is inserted into the reference hole 50. Therefore, when the second positioning pin 34 is inserted into the second reference hole 50, the spring portion 51 is elastically deformed to abut on the pin 34, and the load beam 21 is urged in the axial direction shown by an arrow A in FIG. 8.

A guide surface 53 is formed in the V shape as seen from above in the tip end of the spring portion 51. The guide surface 53 fulfills the centering function to align the center line C1 of the load beam 21 with the pin 34 when the second positioning pin 34 abuts on the guide surface. In FIG. 11, the position deviation of the load beam 21 with respect to the pin 34 in the Y-axis direction can be regulated by an angle θ2 formed by the V-shaped guide surface 53 and a width W2 of the reference hole 50.

The circular third reference hole 60 is formed in the vicinity of the front end of the flexure 22. The first positioning pin 33 is inserted into the reference hole 60. The fourth reference hole 70 is formed in the vicinity of the rear end of the flexure 22. The fourth reference hole 70 is a long hole formed along the axial direction of the flexure 22, and the second positioning pin 34 is inserted into the reference hole 70.

The spring portion 71 is formed in a part of the flexure 22 including the inner peripheral edge of the fourth reference hole 70. For the spring portion 71, since the pair of slits 72 are formed in a part of the flexure 22 along the axial direction, the region between the slits 72 can elastically be deformed in the plate thickness direction.

Similarly as the spring portion 51 shown in FIG. 11, the tip end of the spring portion 71 is several micrometers to several tens of micrometers long from the position in which the spring portion 71 is deflected by insertion of the pin 34 before the second positioning pin 34 is inserted into the reference hole 70. Therefore, when the pin 34 is inserted into the reference hole 70, the spring portion 71 is elastically deformed to abut on the pin 34, and the flexure 22 is urged in the axial direction shown by the arrow A in FIG. 8.

The guide surface 73 is formed in the V shape as seen from above in the tip end of the spring portion 71. The guide surface 73 fulfills the centering function to align the center line C2 of the flexure 22 with the pin 34 when the second positioning pin 34 abuts on the guide surface. Moreover, the length of the spring portion 71 of the flexure 22 is set to be more than that of the spring portion 51, before the pin 34 is inserted into the reference holes 50, 70. Therefore, when the pin 34 is inserted into the reference holes 50, 70, and the spring portion 51 of the load beam 21 is deflected upward as shown in FIG. 10, the tip end of the spring portion 71 of the flexure 22 can abut on the pin 34.

Figure 10:
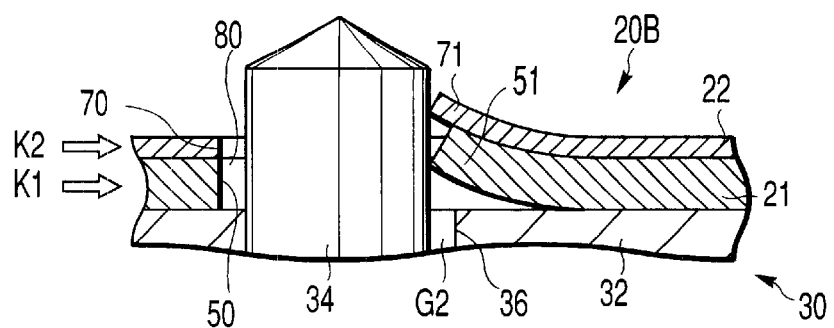
FIG. 10 is a partially enlarged sectional view of the suspension and positioning jig shown in FIG. 8.

The reference holes 50, 70 are elongated holes as shown in FIG. 10. Therefore, when the second positioning pin 34 is inserted into the reference holes 50, 70, that is, when the pins 33 and 34 are pulled toward each other in order to obtain the shortest distance S, a gap 80 exists between the front surface of the second positioning pin 34 and front edges of the reference holes 50, 70.

In this embodiment, when one pin 33 is inserted into the reference holes 40, 60, and the other pin 34 is inserted in the reference holes 50, 70, the spring portion 51 of the load beam 21 and the spring portion 71 of the flexure 22 need to abut on the pin 34 for aligning.

In this embodiment, before the aligned state, a distance FX shown in FIG. 13 between the pin abutment portion of the third reference hole 60 and the pin abutment portion of the spring portion 71 of the fourth reference hole 70 is set to be shorter than a distance LX shown in FIG. 12 between the pin abutment portion of the first reference hole 40 and the pin abutment portion of the spring portion 51 of the second reference hole 50 (FX<LX).

In the suspension 20B constituted as described above, the load beam 21 and flexure 22 are positioned by the positioning jig 30. During the positioning, the first positioning pin 33 is inserted into the first and third reference holes 40 and 60, and the second positioning pin 34 is inserted into the second and fourth reference holes 50 and 70. In this case, since the second positioning pin 34 abuts on the respective tip ends of the spring portions 51 and 71, the load beam 21 and flexure 22 are pulled in the axial direction, using the first positioning pin 33 closer to the head attachment portion 22a as the support. That is, the load beam 21 and flexure 22 are pulled in directions shown by arrows K1, K2 in FIG. 10, respectively, and are both centered. The load beam 21 and flexure 22 can be positioned (aligned) by two positioning pins 33, 34 in this manner. Additionally, during the alignment, the load beam 21 does not have to contact with the flexure 22 in the thickness direction, and a gap may exist between the load beam and the flexure.

According to the suspension 20B of the second embodiment, different from the first embodiment, it is unnecessary to dispose the spring portions 41, 61 in the vicinity of the first and third reference holes 40 and 60. Therefore, the present invention can be applied to the suspension 20B in which holes 81, 82 are formed in the vicinity of the first and third reference holes 40 and 60.

Figure 14:
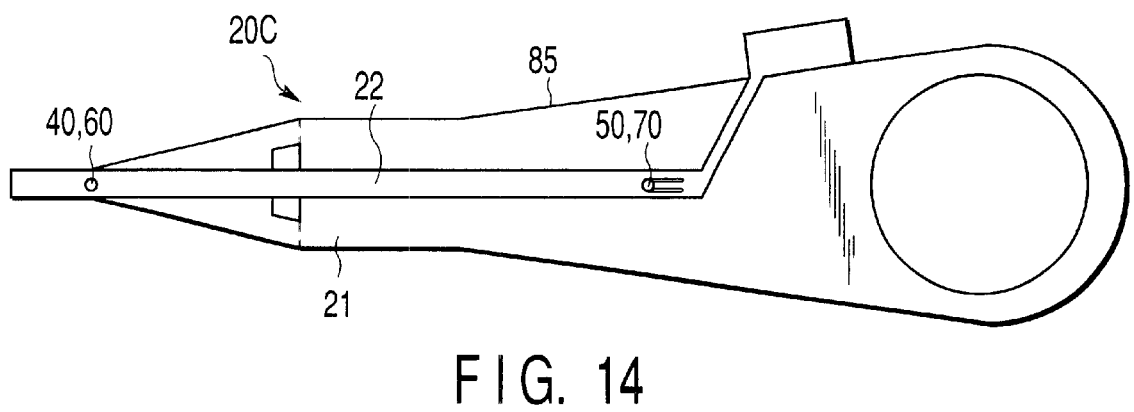
FIG. 14 is a plan view of the suspension according to a third embodiment of the present invention.
Figure 15:
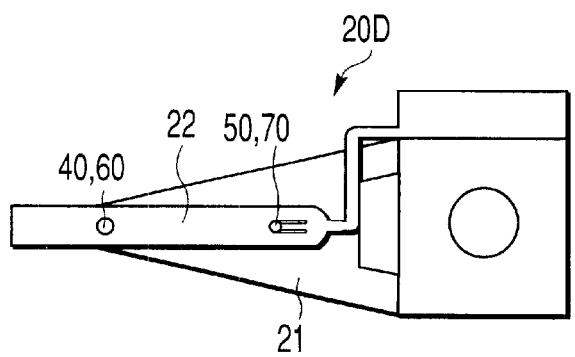
FIG. 15 is a plan view of the suspension according to a fourth embodiment of the present invention.
Figure 16A:
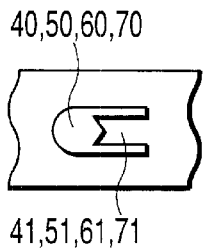
FIG. 16A to FIG. 16F are plan views showing different forms of reference holes and spring portions applied to the present invention.
Figure 16B:
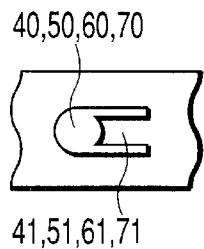
Figure 16C:
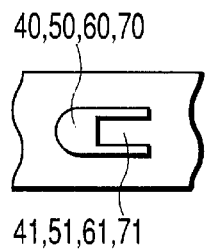
Figure 16D:
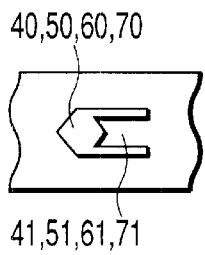
Figure 16E:
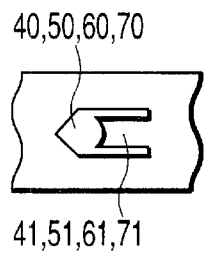
Figure 16F:
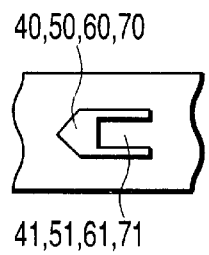
Figure 17A:
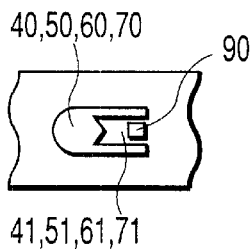
FIG. 17A to FIG. 17F are plan views showing different forms of through holes formed in the spring portions.
Figure 17B:
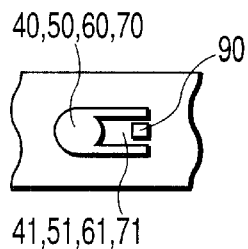
Figure 17C:
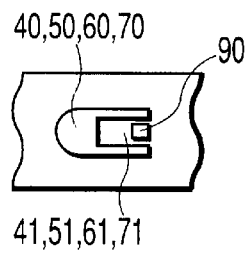
Figure 17D:
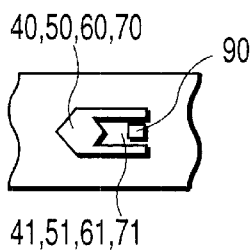
Figure 17E:
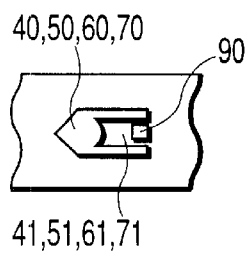
Figure 17F:
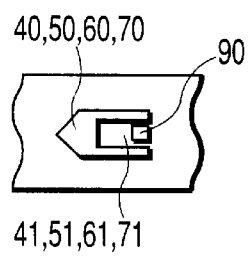
Figure 18A:
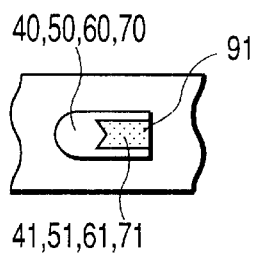
FIG. 18A to FIG. 18F are plan views showing forms in which the entire spring portion is subjected to partial etching.
Figure 18B:
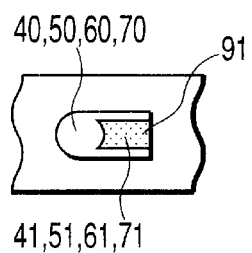
Figure 18C:
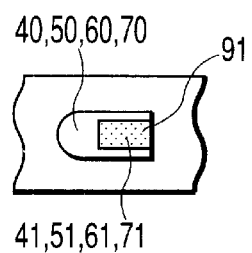
Figure 18D:
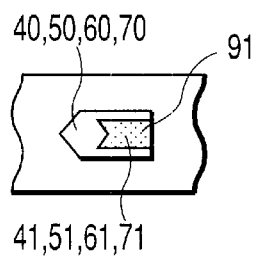
Figure 18E:
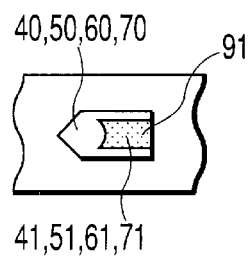
Figure 18F:
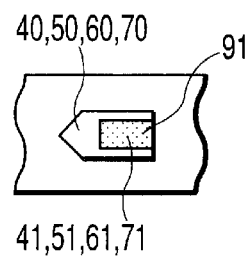
Figure 19A:
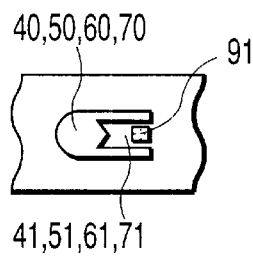
FIG. 19A to FIG. 19F are plan views showing forms in which a part of the spring portion is subjected to partial etching.
Figure 19B:
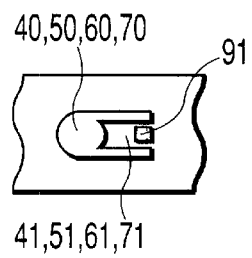
Figure 19C:
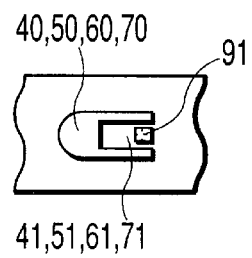
Figure 19D:
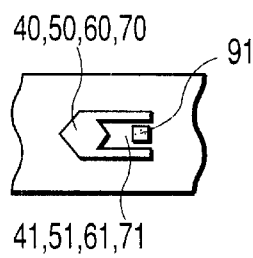
Figure 19E:
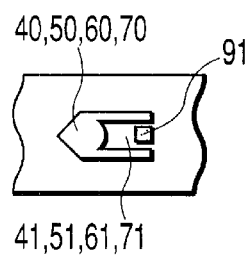
Figure 19F:
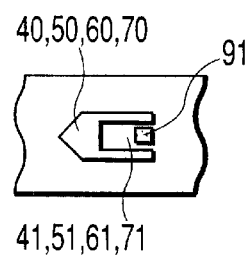
Figure 20A:
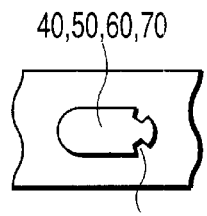
FIG. 20A to FIG. 20F are plan views further forms of the reference hole and spring portion applied to the present invention.
Figure 20B:
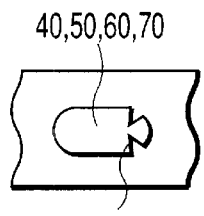
Figure 20C:
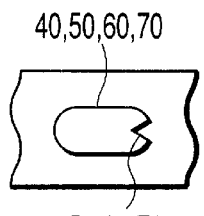
Figure 20D:
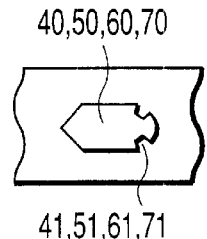
Figure 20E:
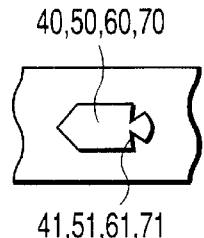
Figure 20F:
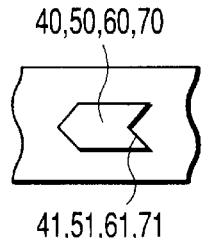
Figure 21A:
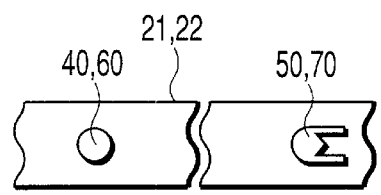
FIG. 21A to FIG. 21L are plan views showing examples of a combination of two reference holes and spring portions applied to the present invention.
Figure 21B:
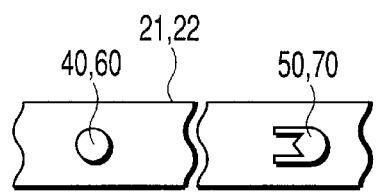
Figure 21C:
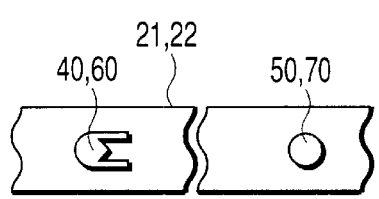
Figure 21D:
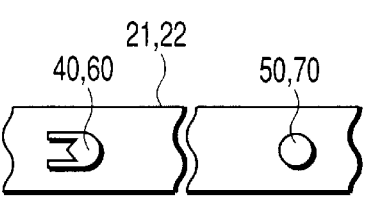
Figure 21E:
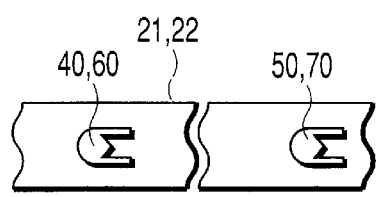
Figure 21F:
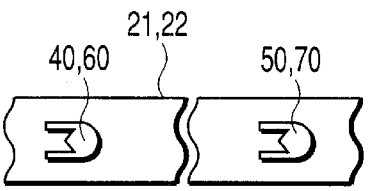
Figure 21G:
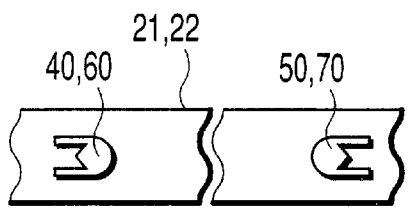
Figure 21H:
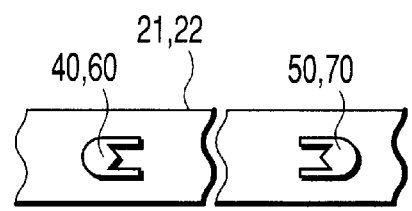
Figure 21I:
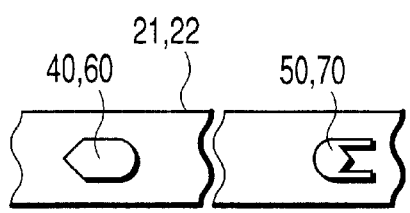
Figure 21J:
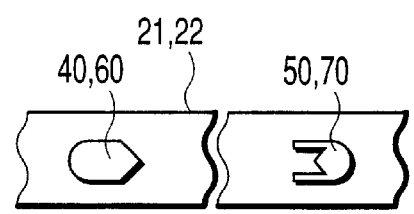
Figure 21K:
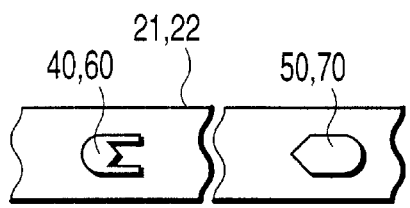
Figure 21L:
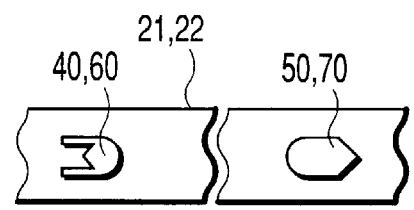
Figure 22:
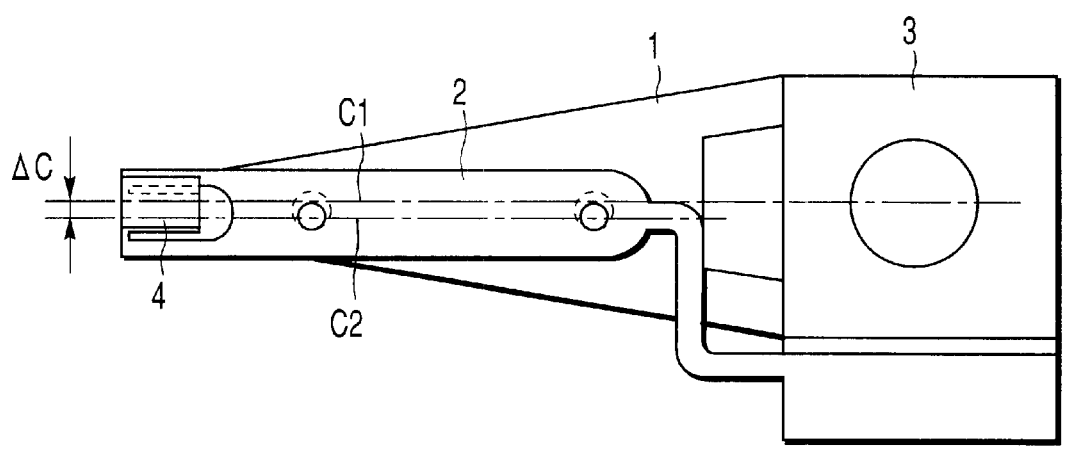
FIG. 22 is a plan view showing a conventional suspension.
Figure 23:
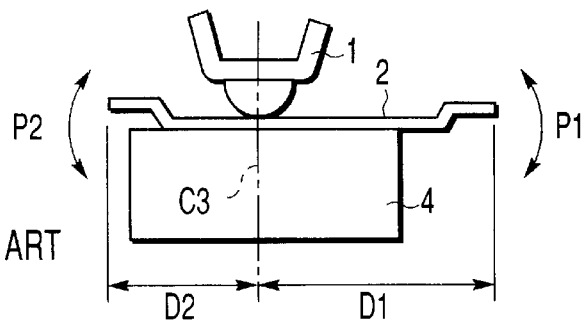
FIG. 23 is a front view of a head section of the suspension shown in FIG. 22.
Figure 24:
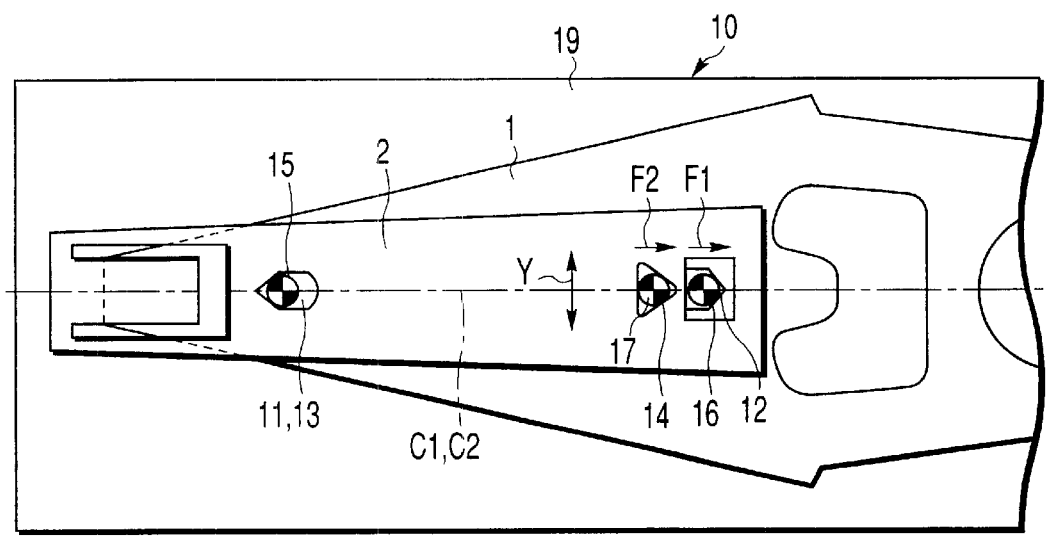
FIG. 24 is a plan view showing a part of the conventional suspension and positioning jig.
Figure 25:
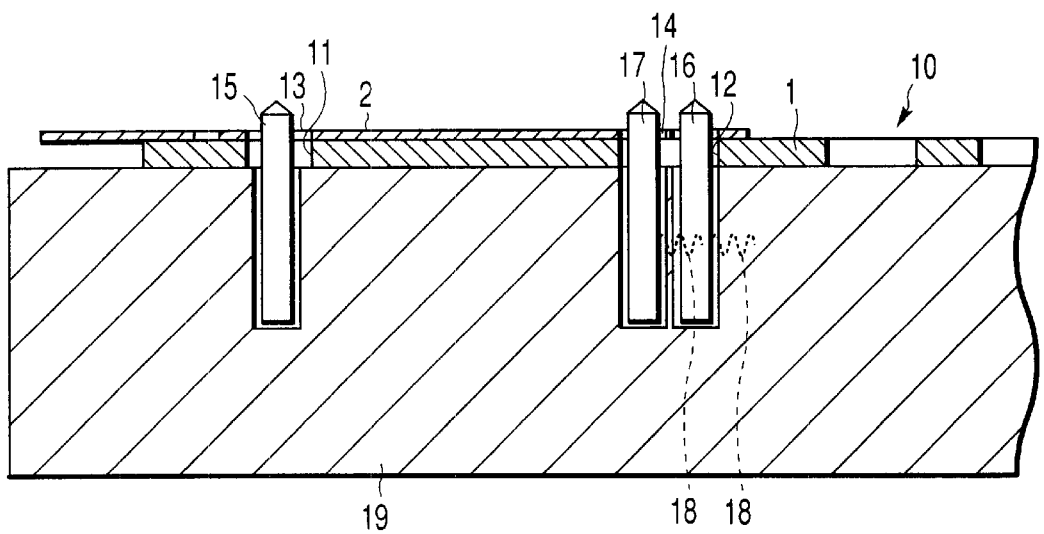
FIG. 25 is a sectional view showing the conventional suspension and positioning jig shown in FIG. 24.

As described above, reference holes and spring portions function as positioning means in the suspensions 20A and 20B. The positioning means can be used in a suspension 20C that has an arm portion 85 as shown in FIG. 14. The positioning means can be used also in another type of a suspension 20D that is shown in FIG. 15.

FIG. 16A to FIG. 16F show shape examples of the reference holes 40, 50, 60, 70 and spring portions 41, 51, 61, 71. FIG. 17A to FIG. 17F show examples in which a through hole 90 is formed in a part of the spring portion in order to reduce the spring constants of the spring portions 41, 51, 61, 71. FIGS. 18A to 18F show examples in which the thickness of the entire spring portion is reduced by partial etching 91 in order to reduce the spring constants of the spring portions 41, 51, 61, 71.

FIGS. 19A to 19F show examples in which the thickness of a part of the spring portion is reduced by the partial etching 91 in order to reduce the spring constants of the spring portions 41, 51, 61, 71. FIG. 20A to FIG. 20F also show the shape examples of the reference holes 40, 50, 60, 70 and spring portions 41, 51, 61, 71. FIG. 21A to FIG. 21L show combination examples of the reference holes 40, 50, 60, 70.

In addition to these embodiments, in order to implement the present invention, it is needless to say that respective elements constituting the present invention such as the concrete shapes and structures of the load beam, flexure, reference hole, spring portion and positioning pin, and the combination of the spring portion and reference hole can appropriately be modified and embodied in a range not departing from the scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A suspension for a disc drive having a load beam, and a flexure fixed at a predetermined position of the load beam, said suspension for the disc drive comprising:
   a first reference hole which is formed in the vicinity of one end of said load beam and into which a first positioning pin is inserted;
   a first spring portion which is formed in a part of the load beam including an inner peripheral edge of said first reference hole and which abuts on said first positioning pin with elastic deformation to urge the load beam in an axial direction thereof;
   a second reference hole which is formed in the vicinity of the other end of said load beam and into which a second positioning pin is inserted;
   a second spring portion which is formed in a part of the load beam including an inner peripheral edge of said second reference hole and which abuts on said second positioning pin with the elastic deformation to urge the load beam in the axial direction thereof;
   a third reference hole which is formed in the vicinity of one end of said flexure and into which said first positioning pin is inserted;
   a third spring portion which is formed in a part of the flexure including an inner peripheral edge of said third reference hole and which abuts on said first positioning pin with elastic deformation to urge the flexure in an axial direction thereof;
   a fourth reference hole which is formed in the vicinity of the other end of said flexure and into which said second positioning pin is inserted; and
   a fourth spring portion which is formed in a part of the flexure including an inner peripheral edge of said fourth reference hole and which abuts on said second positioning pin with the elastic deformation to urge the flexure in the axial direction thereof.

2. The suspension for the disc drive according to claim 1, wherein said first and second spring portions comprise elastically deformable portions between a pair of slits formed along the axial direction in said load beam, and said third and fourth spring portions comprise elastically deformable portions between a pair of slits formed along the axial direction of the flexure.

3. The suspension for the disc drive according to claim 1, wherein a guide surface for aligning center lines of said load beam and flexure with respect to the positioning pin is formed on at least one of a tip end of said spring portion which abuts on said first positioning pin, and the inner peripheral edge of said reference hole.

4. The suspension for the disc drive according to claim 1, wherein a guide surface for aligning center lines of said load beam and flexure with respect to the positioning pin is formed on at least one of a tip end of said spring portion which abuts on said second positioning pin and the inner peripheral edge of said reference hole.

5. The suspension for the disc drive according to claim 1, wherein the tip ends of said third and fourth spring portions project to the inside of said first and second reference holes from the tip ends of said first and second spring portions.

6. The suspension for the disc drive according to claim 1, wherein in order to lower a spring constant of said spring portion, a through hole or a portion with a reduced thickness is formed in at least a part of the spring portion.

7. A suspension for a disc drive having a load beam, and a flexure fixed at a predetermined position of the load beam, said suspension for the disc drive comprising:
   a first reference hole which is formed in the vicinity of one end of said load beam and into which a first positioning pin is inserted;
   a second reference hole which is formed in the vicinity of the other end of said load beam and into which a second positioning pin kept at a constant distance from said first positioning pin is inserted;
   a load beam spring portion which is formed in a part of the load beam including an inner peripheral edge of said first or second reference hole and which abuts on said first or second positioning pin with elastic deformation to urge the load beam in an axial direction thereof;
   a third reference hole which is formed in the vicinity of one end of said flexure and into which said first positioning pin is inserted;
   a fourth reference hole which is formed in the vicinity of the other end of said flexure and into which said second positioning pin is inserted; and
   a flexure spring portion which is formed in a part of the flexure including an inner peripheral edge of said third or fourth reference hole and which abuts on said first or second positioning pin with the elastic deformation to urge the flexure in an axial direction thereof.

8. The suspension for the disc drive according to claim 7, wherein said load beam spring portion comprises an elastically deformable portion between a pair of slits formed along the axial direction of the load beam, and said flexure spring portion comprises an elastically deformable portion between a pair of slits formed along the axial direction of the flexure.

9. The suspension for the disc drive according to claim 7, wherein a guide surface for aligning center lines of said load beam and flexure with respect to the positioning pin is formed on at least one of tip ends of said spring portions which abut on said second positioning pin, and the inner peripheral edges of said second and fourth reference holes.

10. The suspension for the disc drive according to claim 7, wherein the tip end of said flexure spring portion projects to the inside of said second reference hole from the tip end of said load beam spring portion.

11. The suspension for the disc drive according to claim 7, wherein in order to lower spring constants of said respective spring portions, a through hole or a portion with a reduced thickness is formed in at least a part of the spring portion.

12. The suspension for the disc drive according to claim 7, wherein a gap exists between the positioning pin and edges of the reference holes when said second positioning pin is inserted into said second reference hole and said fourth reference hole.

* * * * *